United States Patent [19]

Unverrich

[11] Patent Number: 5,289,390
[45] Date of Patent: Feb. 22, 1994

[54] METHOD FOR DETERMINING THE ELECTRICAL CABLE LENGTH OF AN ACTIVE RING OF A TOKEN RING LOCAL AREA NETWORK

[75] Inventor: Rod Unverrich, Colorado Springs, Colo.

[73] Assignee: Hewlett-Packard Company, Palo Alto, Calif.

[21] Appl. No.: 888,228

[22] Filed: May 22, 1992

[51] Int. Cl.$^5$ .............................. G01B 21/02
[52] U.S. Cl. ..................... 364/562; 370/85.5
[58] Field of Search ............... 364/514, 571.05, 562, 364/578, 569; 370/85.13, 85.1, 85.2, 85.3, 85.5, 86; 371/20.4

[56] References Cited

U.S. PATENT DOCUMENTS

| | | |
|---|---|---|
| 4,593,281 | 6/1986 | Lare .................................. 370/85.2 |
| 4,649,535 | 3/1987 | Ulug .................................. 370/86 |
| 4,675,621 | 6/1987 | Ishizuka et al. ..................... 370/85.5 |
| 4,930,093 | 5/1990 | Houser et al. ...................... 364/569 |
| 5,003,533 | 3/1991 | Watanabe ........................... 370/85.5 |

Primary Examiner—Jack B. Harvey
Assistant Examiner—Thomas Peeso

[57] ABSTRACT

A method and apparatus which measures the electrical cable length of a ring in an active Token-Ring local area network. The system determines the data transmission speed of the ring, the type of cable being used to connect the stations of the ring, the manufacturer of the circuitry used in the active monitor station, and the number of standby monitors actively connected to the ring. The system determines the time between two successive tokens having no intervening non-token frames, and then subtracts the amount of delay through the active monitor station and the amount of delay through each of the standby monitor stations. It then multiplies this result by the speed of light and by a velocity constant determined by the type of cable being used, to produce the total cable length between all active stations on the ring.

14 Claims, 9 Drawing Sheets

METHOD FOR DETERMINING THE ELECTRICAL CABLE LENGTH OF AN ACTIVE RING OF A TOKEN RING LOCAL AREA NETWORK

FIELD OF THE INVENTION

This invention relates to computer systems and more particularly to local area networks that connect computer systems. Even more particularly, the invention relates to an electronic instrument that tests such local area networks.

BACKGROUND OF THE INVENTION

Troubleshooting of Local Area Networks (LANs) requires that the technician have considerable knowledge of how the network functions, including the protocols of the network. In addition, they must have detailed knowledge of each type of message sent over the network, and the implications of each particular type of message being sent. This problem is more severe if a technician must trouble shoot more than one type of LAN, thus they must become familiar with each different protocol.

The cable length for a local area network is an important parameter since all local area networks are limited in the distance over which signals can be sent. Thus, intermittent problems are common if this length is exceeded. For some types of local area networks, the length for a given segment will be static unless a new station is installed or an older station is removed from a segment. However, with a Token-Ring type local area network, the electrical length of the cable within a ring varies each time a station is activated or deactivated. This occurs because activation of a station causes the cable between the station and a media access unit (MAU), to which the station attaches, to be electrically inserted into the ring. Deactivation electrically removes this section of cable from the ring.

This change in cable length due to activating and deactivating stations can cause intermittent problems on a ring of the network. Each station within this type of network repeats each signal received before sending the signal to the next station, thus the cable distance between stations is the limiting factor in the size of the ring. If several adjacent stations are deactivated, particularly when all stations connected to a single MAU are deactivated, the length between active stations can exceed the specifications of the network, which can cause intermittent failures. Thus it is important in troubleshooting a Token-Ring network to be able to ascertain the cable length between all the active stations.

In prior art systems, the only known way to measure the length of a Token-Ring network is to use a time domain reflectometer device while the network is inactive. When the network is inactive, however, the stations are not electrically connected to the network. Thus, there is no prior art way to measure the actual length of an active Token-Ring local area network while it is active.

Of course the length can be measured by physically measuring the length of cable between each station and the MAU, measuring the length of cables between each MAU in the ring, manually determining which stations are actively connected to the network at the time the length is to be measured, and then manually adding the length of the cable between the multiple excess units and the cable length for each of the stations that is currently active. This is a time consuming process and prone to errors.

There is need in the art then for a way of measuring the length of a Token-Ring local area network while that network is active.

SUMMARY OF THE INVENTION

It is an aspect of the present invention to determine the cable length of a Local Area Network.

It is another aspect of the invention to determine the length of a ring of a Token-Ring Local Area Network.

It is another aspect to determine the electrical length of the cable connecting all active stations of a Token-Ring Local Area Network.

The above and other aspects of the invention are accomplished in a system which measures the cable length of an active Token-Ring local area network. The system determines the speed of the local area network and the type of cable being used to connect the stations of the network. The system further determines the manufacturer of the circuitry used in the station that is currently the active monitor within the ring, since the delay time through an active monitor varies from manufacturer to manufacturer. The system also determines the number of standby monitors, that is, active stations that are not active monitors. After determining these parameters, the system waits for a token frame to pass through the network and then it starts a timer. The system then waits for a second token frame to be sent over the network, and if there were no intervening message frames between the two tokens, the value of the timer at the time the second token frame arrives is used to calculate the length of the network. The time between the two token frames is called the propagation delay and from this propagation delay the system subtracts the amount of delay through the active monitor station. It also subtracts the amount of delay for the token frame to pass through each of the other stations on the network and the multiplies this result by the speed of light and by a velocity constant determined by the type of cable being used, which produces the total cable length between all active stations on the ring.

BRIEF DESCRIPTION OF THE DRAWINGS

The above and other aspects, features, and advantages of the invention will be better understood by reading the following more particular description of the invention, presented in conjunction with the following drawings, wherein:

FIGS. 2-8 show a flowchart of the method of the invention;

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
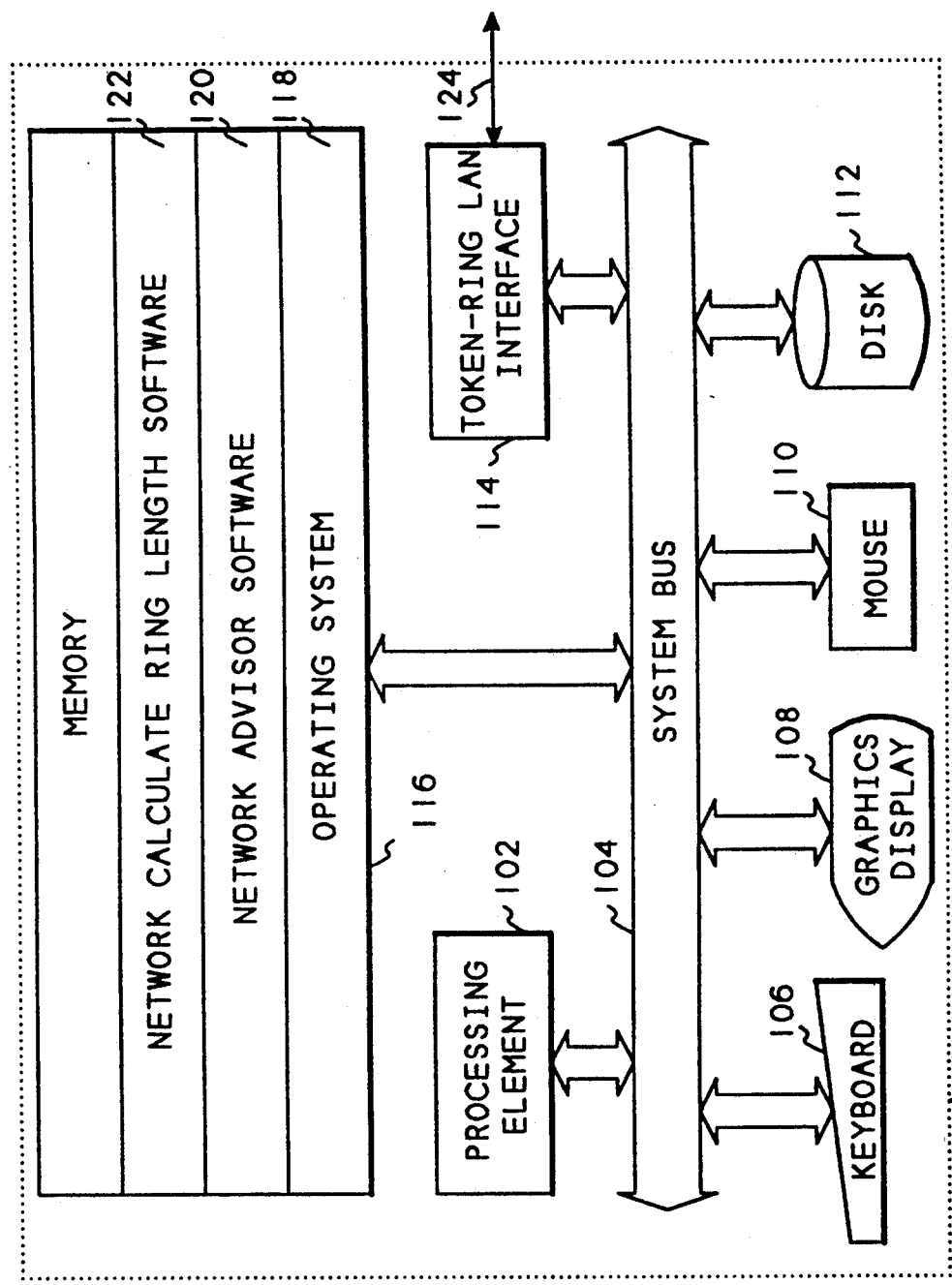
FIG. 1 shows a block diagram of the invention.

FIG. 1 shows a block diagram of the hardware and software of the invention. Referring now to FIG. 1, a computer system 100 contains a processing element 102 which communicates to other elements of the computer system 100 over a system bus 104. A keyboard 106 allows user of the system 100, typically a technician trouble shooting a local area network, to input commands and data into the computer system 100. Optionally, a mouse 110, allows the user to input graphical information into the computer system 100. A display 108 allows the computer system 100 to output information to the user of the system. A disk 112 stores the software of the present invention as well as all the data collected by the present invention.

A memory 116 contains an operating system 118 which is used by the present invention to access the keyboard 106, graphics display 108, mouse 110, disk 112, as well as other elements of the computer system 100. The operating system 118 also provides the timers used in the system. The calculate ring length software 122, of the present invention, is part of the network advisor software 120 which performs other trouble shooting functions for the user of the system. The system 100 accesses the Token-Ring local area network (LAN) 124 through a Token-Ring LAN interface 114. The Token-Ring LAN interface 114 provides the hardware necessary for the calculate ring length software to access a Token-Ring local area network. A different local area network interface, not shown, could be used by the ring length software to access other types of local area networks.

Token-Ring networks use token and message medium access control (MAC) frames to transmit data on the local area network. A Token-Ring local area network is made up of a group of stations connected together, wherein messages, or frames, pass from one station to another. These stations are connected as a ring, with the last station connected to the first station in the ring, such that a message will return to the station that sent the message. Rings may be connected together, through devices called bridges or routers, to other rings to form a network.

A token is a control signal that is passed around the ring, from station to station, between transfers of data. A frame is the basic unit of data transmission, and includes delimiters, control characters, checking characters, and data. A token is a special type of frame. When a station wishes to transmit data, it waits until it receives a token frame, and it changes the token frame into the start of a message frame. It then appends its address, called the source address, and the address of the destination network station and passes the frame along to the next station. The frame is then passed in series from station to station along the network. As the frame passes the destination station, the destination station copies the frame as it passes the frame down to the next station in the network. After the frame circles the network, the frame returns to the originating station, which removes the frame from the network and releases a new token frame for the next station waiting to transmit data.

One station on the network is designated as the active monitor, although any station on the network may be assigned active monitor duty from time to time. All other stations on the network serve as standby monitors, ready to assume active monitor duty if the active monitor is impaired or leaves the network. A token claiming process is used to elect a new active monitor. The active monitor performs token monitoring and other basic maintenance functions including timing control via a master clock, initiating and monitoring the ring polling process, or neighbor notification. The active monitor also insures that tokens and frames move along in a timely and orderly manner within the local area network. If the preset time for a token to completely circle the ring is exceeded, the active monitor purges the ring and issues a new token.

Figure 2:
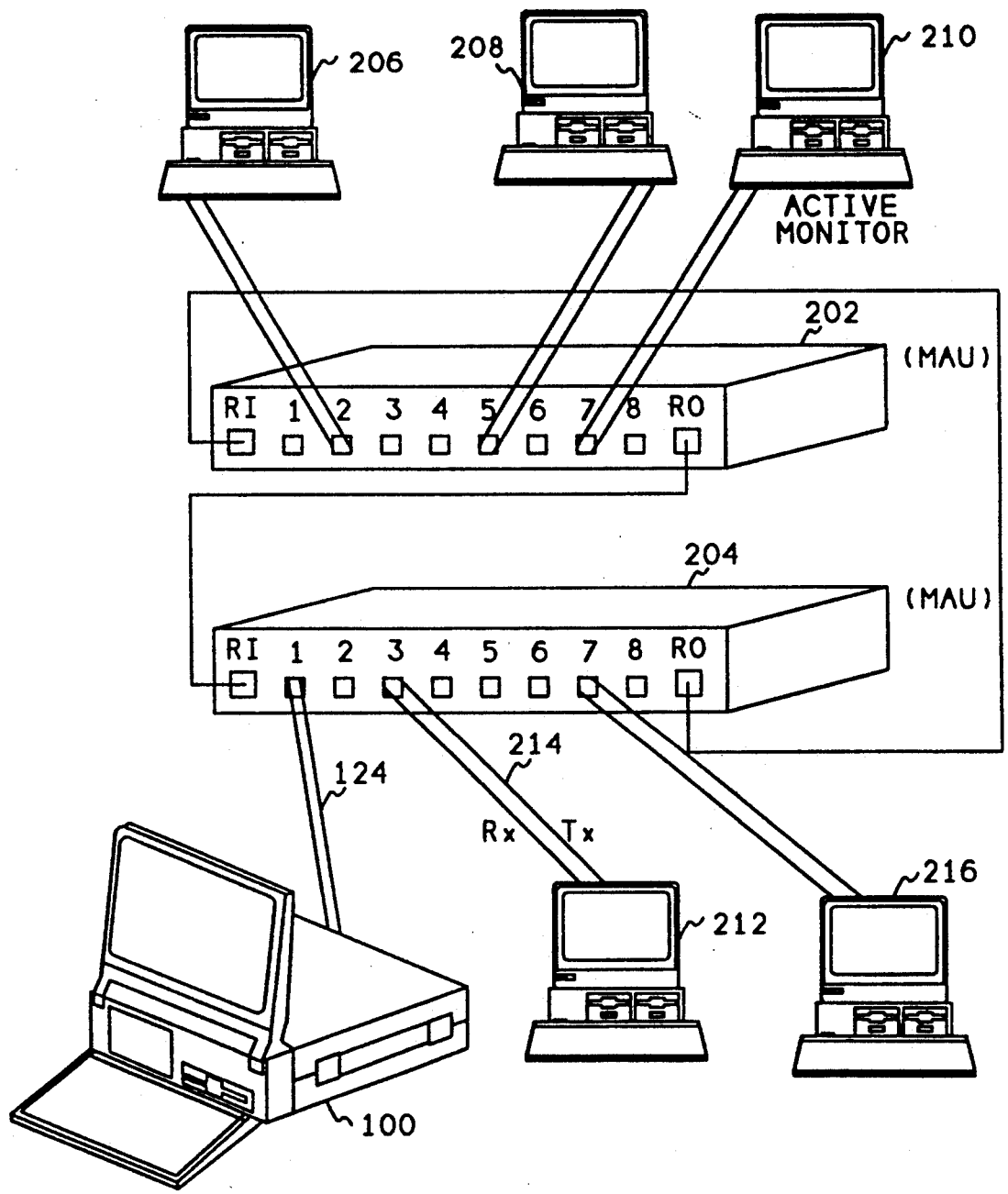
FIG. 2 shows a block diagram of a local area network being tested by the invention.

FIG. 2 shows a block diagram of a local area network being tested by the system 100 of the present invention. Referring now to FIG. 2, in a Token-Ring local area network, all of the network stations connect to each other through multistation access units (MAUs) 202 and 204. A MAU, such as the MAU 202 or the MAU 204, typically has eight connection ports as well as a ring input port, and a ring output port. Multiple MAUs may be connected together by serially connecting the ring output of one MAU to the ring input of another MAU. The ring output of the last MAU within the local area network ring is connected to the ring input of the first MAU within the ring. This type of connection is shown in FIG. 2 wherein the ring output of MAU 202 connects to the ring input of MAU 204, and the ring output of MAU 204 connects back to the ring input of MAU 202, to complete a loop.

As shown in FIG. 2, three network stations, 206, 208, and 210 are connected to ports 2, 5, and 7 of the MAU 202, respectively and two network stations, 212, 216 are connected to ports 3 and 7 of MAU 204, respectively. The system 100 of the present invention, is shown connected to port 1 of the MAU 204, through interface cable 124. Station 210, identified as the "ACTIVE MONITOR", is identical to the other network stations, however, it is currently assigned active monitor duty.

When a station activates, the station switches a relay in the MAU which electrically connects the cable between the station and the MAU into the ring. For example, if station 212 is inactive, the cable 214 is not electrically connected in the ring, and the length of cable 214 is not part of the total cable length in the ring. When station 212 activates, it switches a relay at port 3 of MAU 204 which electrically connects cable 214 into the ring. After the relay is switched, the length of cable 214 is added to the total length of the cable in the ring. Thus, the electrical length of the cable in a ring is related to the number of active stations.

FIGS. 3-8 show a flowchart of the network calculate ring length software o the present invention. This system is called by the network advisor software 120 (FIG. 1) when a user of the system requests that a ring length calculation be performed. Referring now to FIGS. 3-6, the network advisor software would call FIG. 3 to start the calculation process. After entry, block 302 calls FIG. 4 to determine the number of standby monitor stations actively connected to the network. Block 304 then calls FIG. 5 to determine the manufacturer of the network interface cord of the active monitor. Block 306 calls FIG. 6 to determine the network propagation delay, and block 308 calls FIG. 7 to calculate the electrical length of the ring, and to display the length to a user of the system.

Figure 3:
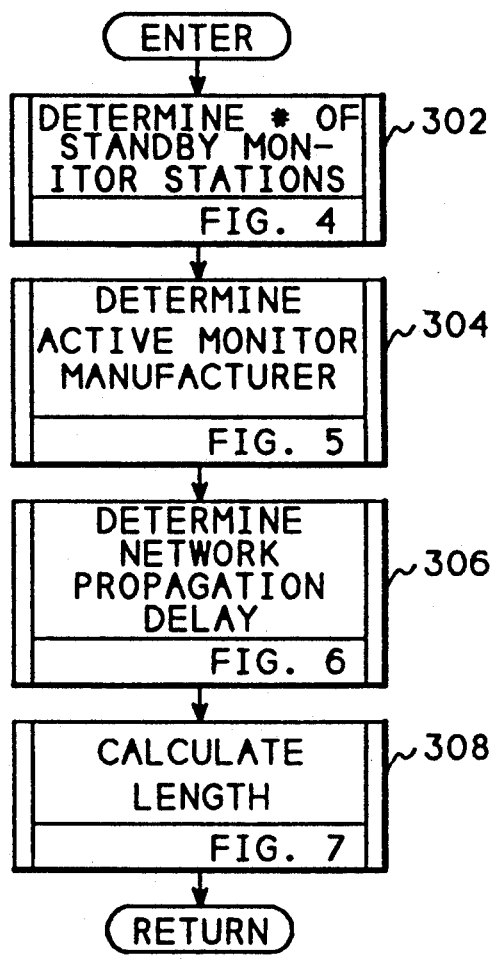
Figure 4:
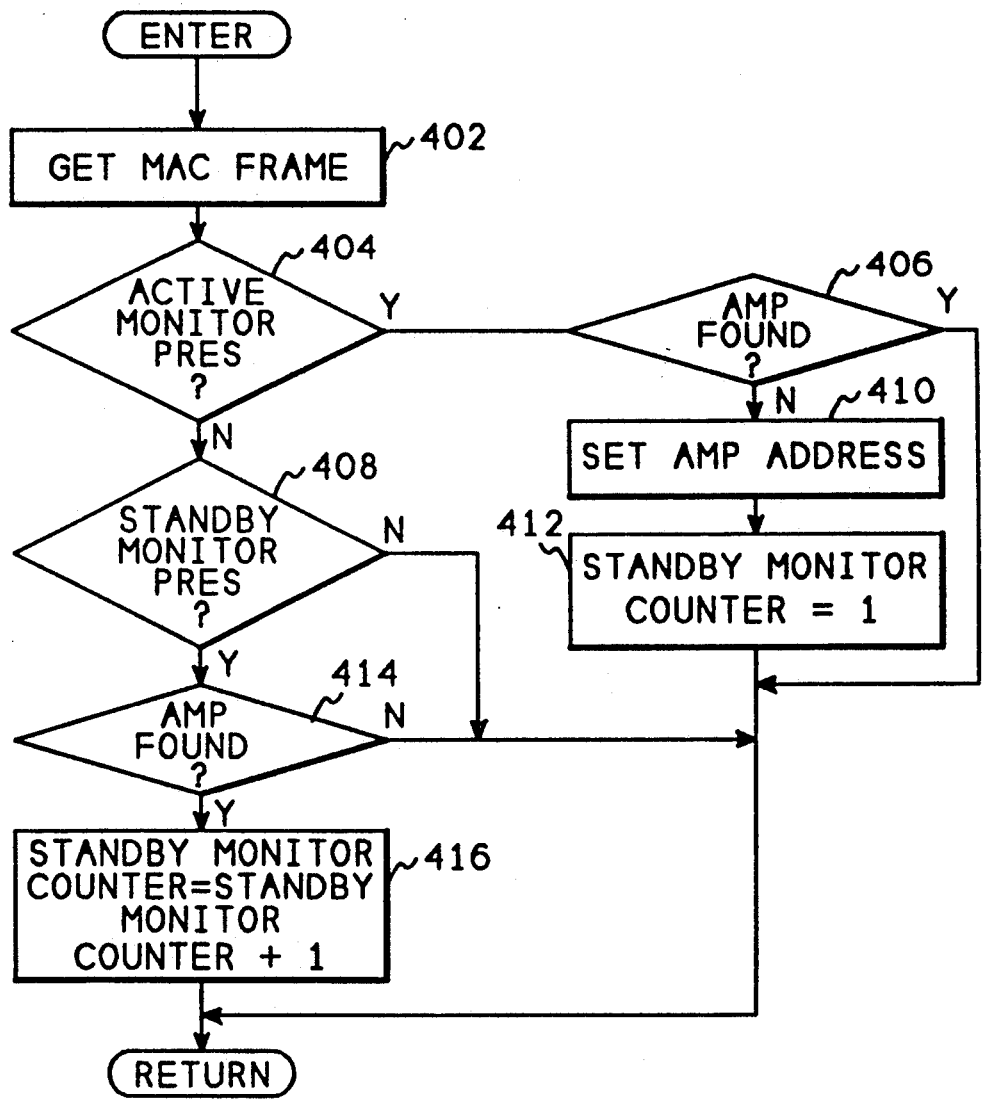

FIG. 4 shows a flowchart of the process for determining the number of standby monitors actively connected to the network. Referring now to FIG. 4, after entry, block 402 gets the next MAC frame sent around the Token-Ring local area network. Block 404 then determines if the frame is an active monitor present frame. If the frame is an active monitor present frame, block 404 transfers to block 406 which determines if there is an active monitor present (AMP). If an active monitor present has already been detected, block 406 returns to FIG. 3.

If an active monitor present has not been previously found, block 406 goes to block 410 which sets the AMP address from this frame, and block 412 sets the standby monitor counter to 1 before returning to FIG. 3.

If the frame is not an active monitor present frame, block 404 transfers to block 408 which determines whether the frame is a standby monitor present frame. If the frame is a standby monitor present frame, block 408 transfers to block 414 which determines if an active monitor present has been found. If not, block 414 returns to FIG. 3. If an AMP has been found, block 414 goes to block 416 which increments the standby monitor counter. Each time a new standby monitor present frame is detected, the standby monitor count counter is incremented, resulting in the total number of standby monitors actively connected to the network. After incrementing the standby monitor counter, block 410 returns to block 302 to get the next MAC frame.

If the frame is not a standby monitor present frame, block 408 returns to FIG. 3.

Figure 5:
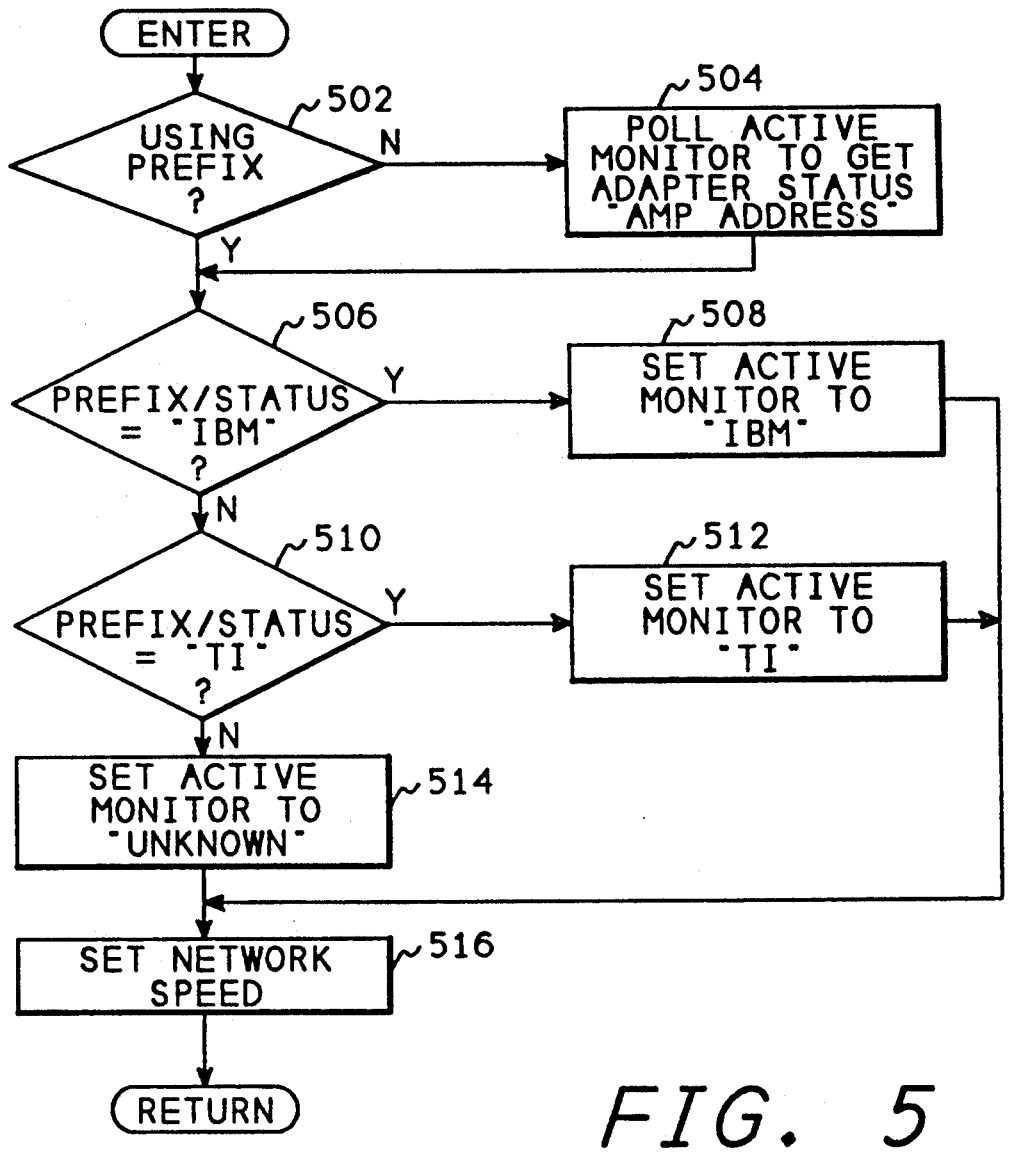

FIG. 5 shows the process of determining the manufacturer of the interface electronics within the active monitor, which was called from block 304 of FIG. 3.

The active monitor delay is the delay time for a token to transit through the MAC layer finite state machine within the active monitor station. Unfortunately, this delay depends on the manufacturer of the electronic integrated circuits contained within the local area network interface card of the machine that is currently performing the active monitor duties. Currently, IBM and Texas Instruments are two major manufacturers of the integrated circuits for these interface cards. The manufacturer of these cards can be determined by two different methods: a) monitoring the physical address of the active monitor on the ring, since each manufacturer has a unique six digit hexadecimal prefix to the MAC address; b) after identifying the active monitor address, poll the active monitor requesting the adapter status information which will uniquely identify the card.

Referring now to FIG. 5, after entry, block 502 determines whether the system is using prefix bits of the active monitor address to determine the manufacturer type. If the system is not using the prefix method, block 502 transfers to block 504 which polls the active monitor, using the AMP address detected earlier (see FIG. 4), to get the adapter status information. Since the MAC address is present in the MAC frame, no poll is necessary if the prefix method is being used. In either case, control transfers to block 506 which determines whether the prefix or status indicates that the integrated circuit manufacturer was IBM. If so, block 506 transfers to block 508 which sets the active monitor to "IBM" and then transfers to block 516. If the prefix status does not indicate IBM, block 506 transfers to block 510 which determines whether the prefix/status indicates the manufacturer is Texas Instruments. If so, block 510 transfers to block 512 which sets the active monitor to "TI" and then transfers to block 516. If neither manufacturer is identified, block 510 transfers to block 514 which sets the active monitor to unknown. Block 516 then determines and sets the network speed before returning to FIG. 3.

Figure 6:
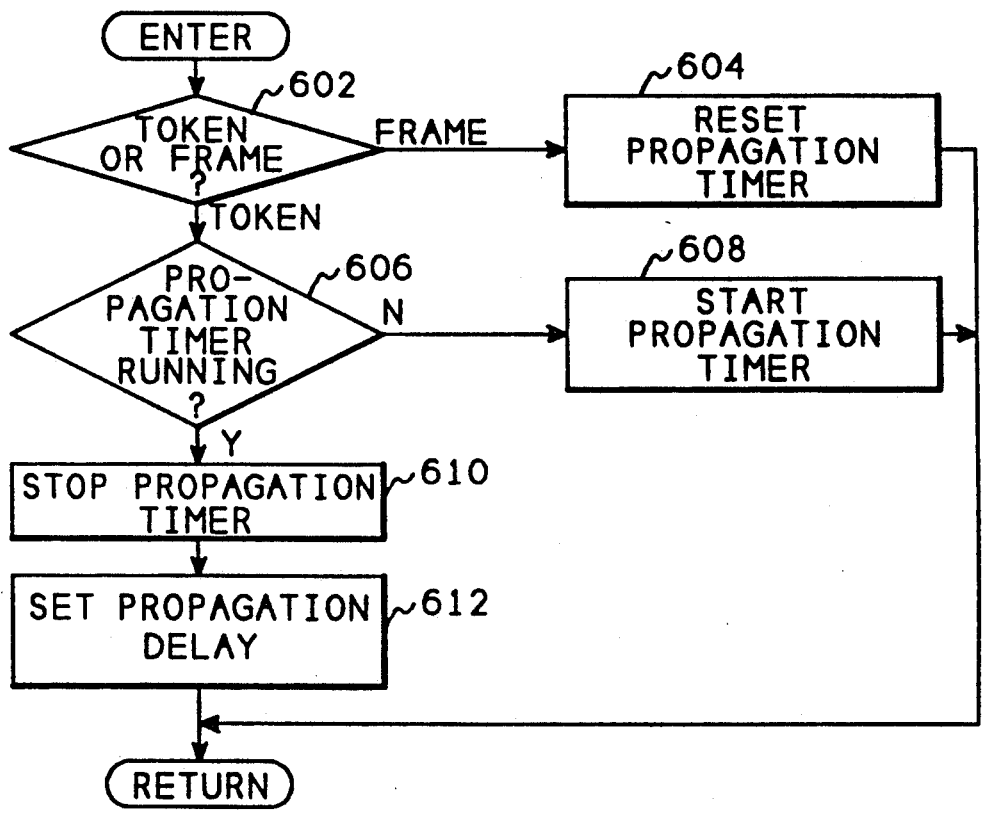

FIG. 6 shows the determine network propagation delay process called from block 306 of FIG. 3. Referring now to FIG. 6, after entry, block 602 determines whether the MAC frame received was a token frame. If the frame was not a token frame, block 602 transfers to block 604 which resets the propagation timer, since propagation delay cannot be determined while non-token frames are being sent through the network. After resetting the propagation timer block 604 returns to FIG. 3.

If the MAC frame is a token frame, block 602 transfers to block 606 which determines whether the propagation timer is currently running. If the propagation timer is currently running, the system previously received a token frame and is now in the process of determining the propagation delay. If the propagation timer is not running, however, a non-token frame has been received since the last token frame and propagation delay is not currently being determined. If the propagation timer is not running, block 606 transfers to block 608 which starts the propagation timer before returning to FIG. 3.

If the propagation timer is currently running, block 606 transfers to block 610 which stops the propagation timer and retrieves the time as the propagation delay time. Block 612 then sets the propagation delay before returning to FIG. 3.

Figure 7:
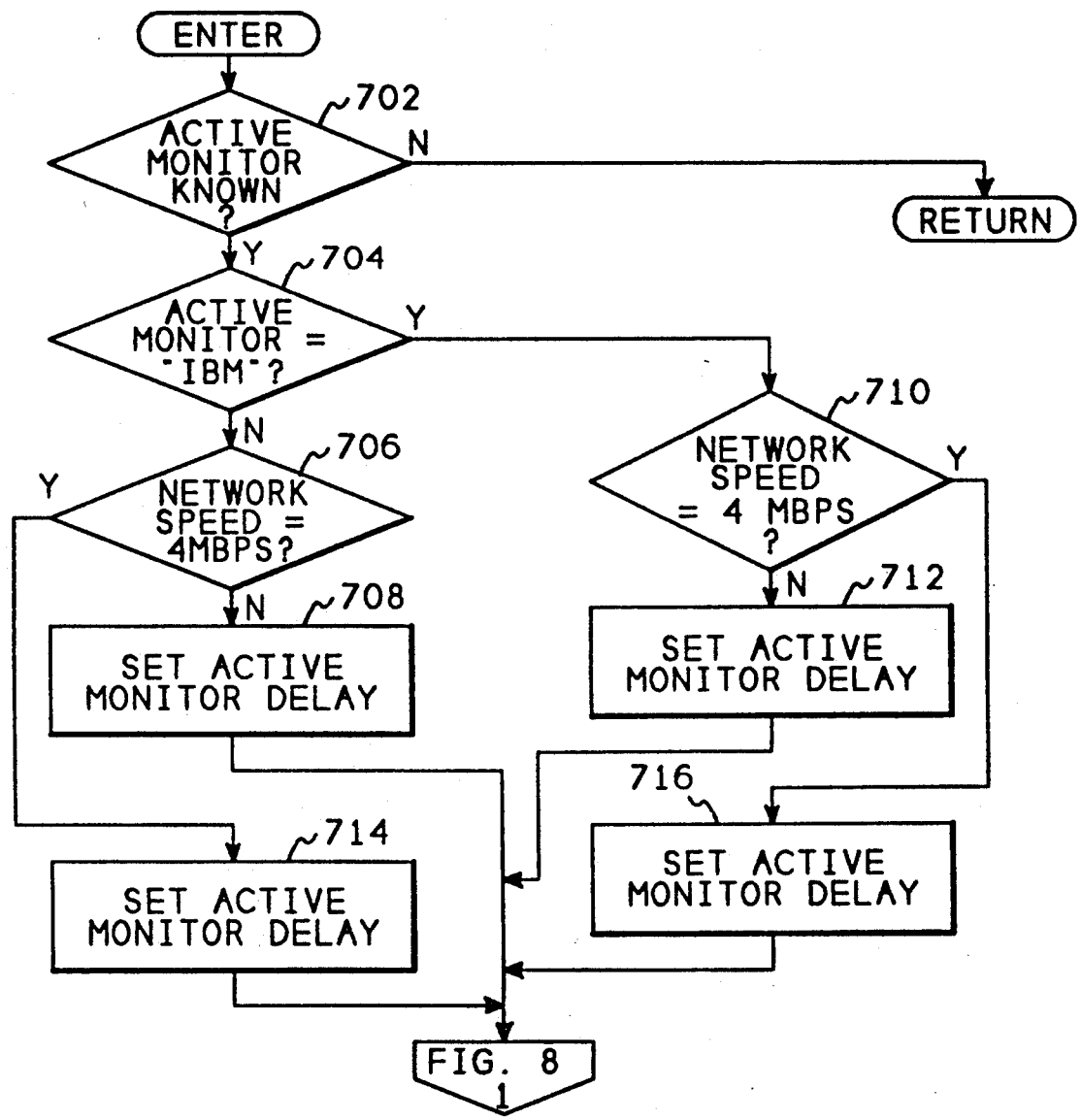

FIG. 7 shows a flowchart of the process of calculating the electrical length of the Token-Ring network. Referring now to FIG. 7, after entry, block 702 determines whether the active monitor manufacturer is known and if the active monitor is not known, block 702 simply returns to FIG. 3 since the length cannot be calculated until the type of active monitor is known. If the active monitor is known, block 702 transfers to block 704 which determines whether the monitor type is "IBM" and if so, transfers to block 710. Block 710 determines whether the speed is four megabits per second and if so, transfers to block 716 which uses Table 1 to set the active monitor delay to the value for a four megabit network using IBM manufactured integrated circuits in the active monitor station, that is, 15.205 microseconds.

If the speed is not four megabits per second, that is, the speed is 16 megabits per second, block 710 transfers to block 712 which uses Table 1 to set the active monitor delay to the delay for a 16 megabits per second Token-Ring using IBM manufactured integrated circuits, that is, 3.907 microseconds.

If the monitor is not IBM, block 704 transfers to block 716 which determines the speed and if the speed is four megabits per second, block 706 transfers to block 714 which uses Table 1 to set the active monitor delay to a four megabits per second network using Texas Instrument manufactured integrated circuits, that is 7.705 microseconds. If the speed is not four megabits per second, block 706 transfers to block 708 which uses Table 1 to set the active monitor delay to a 16 megabits per second network using Texas Instrument manufactured integrated circuits, that is, 2.739 microseconds.

Figure 8:
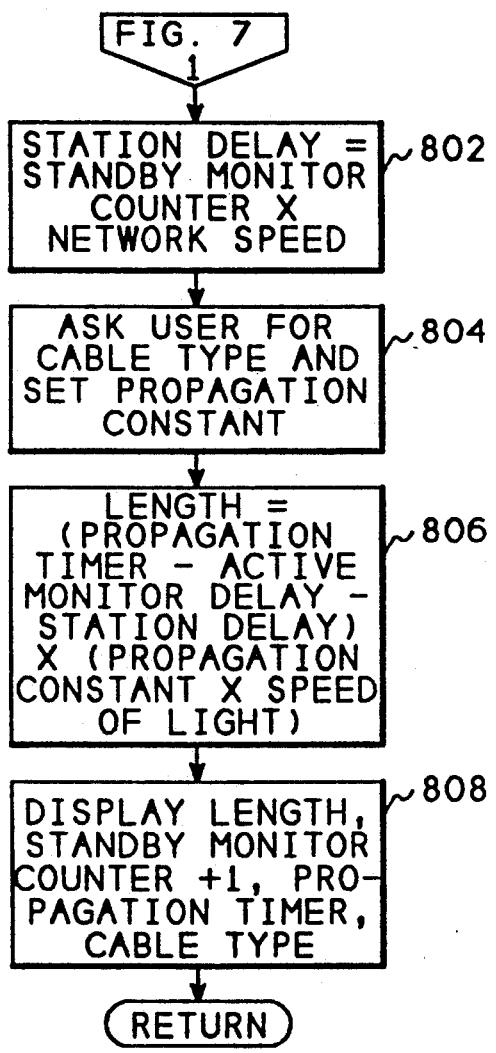

After determining the monitor delay, FIG. 7 transfers to block 802 of FIG. 8. Block 802 calculates the station delay using Table 3 by multiplying the number of standby monitors as indicated by the standby monitor counter by the propagation delay through a station, based on the network speed constraint, to determine the total amount of delay through all of the standby monitor stations in the network. Block 804 then asks the user for the cable type and sets a propagation constant based on the type of cable. The current cable types in use and the propagation constants for each of those is shown in Table 2.

After determining the propagation constant, block 806 determines the actual cable length by subtracting the active monitor delay and the station delay from the value determined by the propagation timer and multiplying the result by the propagation constant and the speed of light. Block 808 then displays the length, the standby monitor counter plus one, which indicates the total number of stations actively connected to the ring, the propagation timer, which indicates the amount of time a token needs to totally circumvent the ring, and the cable type on a display for the user. An example of this display will be described below with respect to FIG. 9. After performing the display, FIG. 8 returns to FIG. 3.

Figure 9:
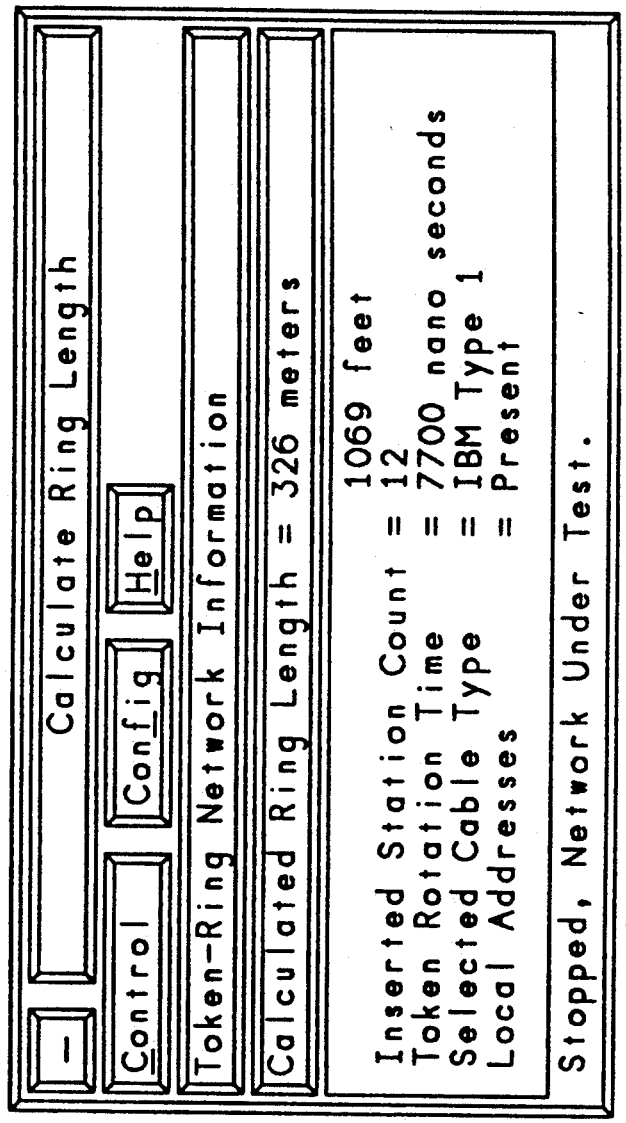
FIG. 9 shows an output display from the invention.

FIG. 9 shows a typical display output of the method of the present invention. Referring now to FIG. 9, the display indicates that the method has displayed the length of the network, the number of stations in the network, the amount of time a token needs to pass through every station on the network, and the cable type used to construct the network.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

Active Monitor Station Delay

| Mfg | Speed | |
|---|---|---|
| | 4 Mbps | 16 Mbps |
| IBM | 15.205 us | 3.907 us |
| TI | 7.705 us | 2.739 us |

TABLE 2

Cable Propagation constant

| Mfg | Cable Type | | | | |
|---|---|---|---|---|---|
| | 1 | 2 | 3 | 6 | 9 |
| IBM | .78 | .78 | .60 | .78 | .80 |

TABLE 3

Standby Monitor Station Delay

| Speed | Delay |
|---|---|
| 4 Mbps | 625 nanoseconds |
| 16 Mbps | 218 nanoseconds |

TABLE 4

Address prefix identifiers

| Mfg | Prefix |
|---|---|
| IBM | 10005A |
| TI | depends upon the printed circuit card manufacturer |

What is claimed is:

1. A method performed by a computer for determining the cable length of a ring of a Token-Ring local area network, said computer performed method comprising:

(a) determining a ring propagation time required for a signal to pass through each station actively connected to said ring;

(b) determining an active monitor propagation delay for a signal to pass through an active monitor station connected to said ring;

(c) determining a station propagation delay for a signal to pass through a standby monitor station connected to said ring;

(d) determining a number of standby monitor stations actively connected to said ring;

(e) multiplying said number of standby monitor stations by said station propagation delay to create a total station propagation delay;

(f) substracting said active monitor propagation delay and said total station propagation delay from said ring propagation time to create a cable propagation delay; and (g) multiplying said cable propagation delay by the speed of light and a cable propagation constant to determine said cable length.

2. The method of claim 1 wherein step (b) further comprises the steps of:

(b1) determining a manufacturer identifier of ring interface electronics within said active monitor station;

(b2) determining a speed at which data is being transmitted through said ring; and (b3) using said manufacturer identifier and said speed as indices to access a table, located in said computer, containing said active-monitor propagation delay.

3. The method of claim 2 wherein step (b1) further comprises the step of:

(b1a) polling said active monitor station to retrieve status information containing said manufacturer identifier.

4. The method of claim 2 wherein step (b1) further comprises the steps of:

(b1a) extracting a prefix from a physical address of said active monitor station;

(b1b) using said prefix as an index to access said table containing said manufacturer identifier.

5. The method of claim 1 wherein step (c) further comprises the steps of:

(c1) determining a speed at which data is being transmitted through said ring; and (c2) using said speed as an index to access a table, located in said computer, containing standby monitor station delays for each speed at which data can be transmitted through said ring.

6. The method of claim 1 wherein step (g) further comprises the steps of:

(c1) determining a cable manufacturer and a cable type for cable used to connect said active monitor station and said standby monitor stations to said ring; and (c2) using said cable manufacturer and said cable type as indices to access a table, located in said computer, containing said cable propagation constant.

7. The method of claim 1 wherein step (d) further comprises the steps of:

(d1) resetting a counter when an active monitor present MAC frame is received; or when beacon purge or claim token MAC frame received and (d1) incrementing said counter each time a standby monitor present MAC frame is received;

whereby said counter indicates the number of standby monitor stations actively connected to said ring.

8. An apparatus for determining the cable length of a ring of a Token-Ring local area network, said apparatus comprising:

a time for timing a ring propagation time required for a signal to pass through each station actively connected to said ring;

means for determining an active monitor propagation delay for a signal to pass through an active monitor station connected to said ring;

means for determining a station propagation delay for a signal to pass through a standby monitor station connected to said ring;

a counter for counting a number of standby monitor stations actively connected to said ring;

a multiplier circuit for multiplying said number of standby monitor stations by said station propagation delay to create a total station propagation delay;

a circuit for subtracting said active monitor propagation delay and for subtracting said total station propagation delay from said ring propagation time to create a cable propagation delay; and a second multiplier circuit for multiplying said cable propagation delay by the speed of light and by a cable propagation constant to produce said cable length.

9. The apparatus of claim 8 wherein said means for determining active monitor delay further comprises:

means for determining a manufacturer identifier of ring interface electronics within said active monitor station;

means for determining a speed at which data is being transmitted through said ring; and table access means for using said manufacturer identifier and said speed to index a table in said apparatus and retrieve said active-monitor propagation delay.

10. The apparatus of claim 9 wherein said means for determining a manufacturer further comprises:

network polling means for polling said active monitor station to retrieve status information containing said manufacturer identifier.

11. The apparatus of claim 9 wherein said means for determining a manufacturer further comprises:

means for extracting a prefix from a physical address of said active monitor station for use as said manufacturer identifier.

12. The apparatus of claim 8 wherein said means for determining a station propagation delay further comprises:

means for determining a speed at which data is being transmitted through said ring; and table access means for using said speed as an index to access a data table containing standby monitor station delays for each speed at which data can be transmitted through said ring.

13. The method of claim 8 wherein said second multiplier circuit further comprises:

means for determining a cable manufacturer and cable type for cable used to connect said active monitor station and standby monitor stations to said ring; and table access means for using said cable manufacturer and said cable type as indices to access a table containing said cable propagation constant.

14. The method of claim 8 wherein said counter further comprises:

means for resetting said counter when an active monitor present MAC frame is received; and means for incrementing said counter each time a standby monitor present MAC frame is received.

* * * * *